May 13, 1941.  W. J. DE WITT  2,242,059
BOX
Filed March 11, 1939   2 Sheets-Sheet 1
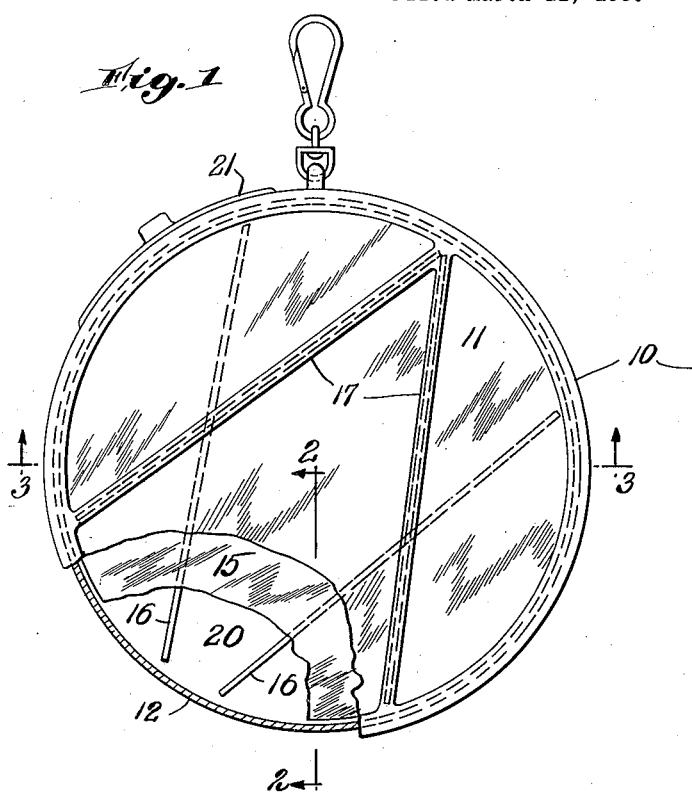
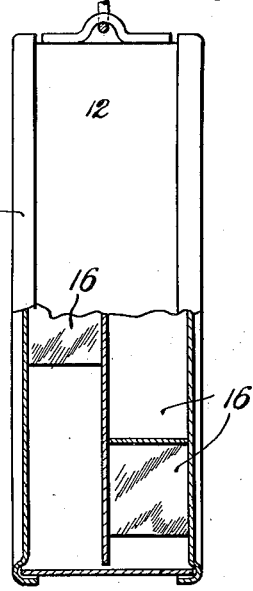
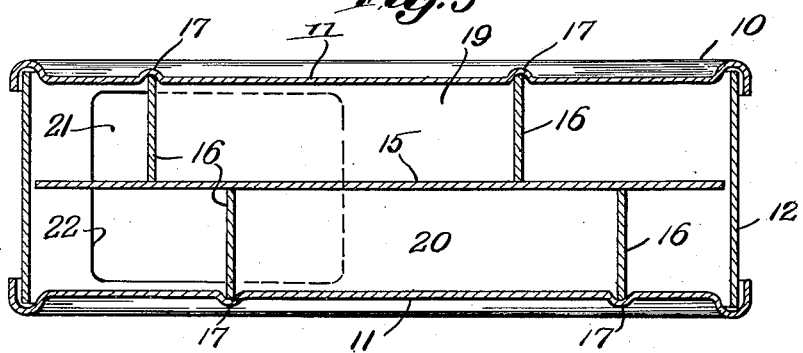
Inventor:
William J. DeWitt
by Roberts, Cushman and Woodbury
his Attys.

May 13, 1941. W. J. DE WITT 2,242,059
BOX
Filed March 11, 1939 2 Sheets-Sheet 2
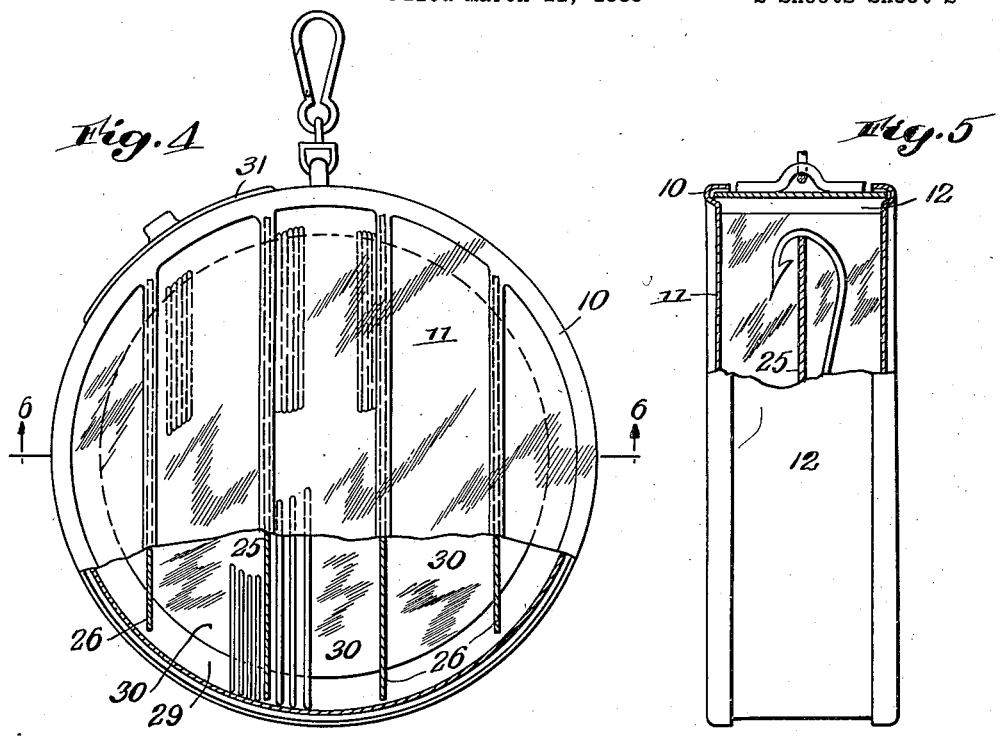
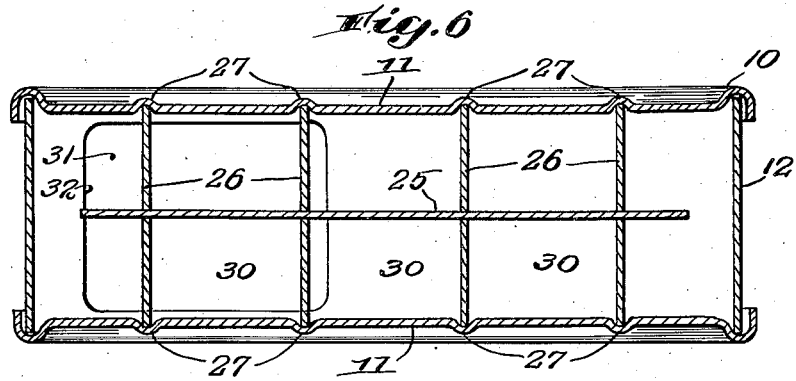
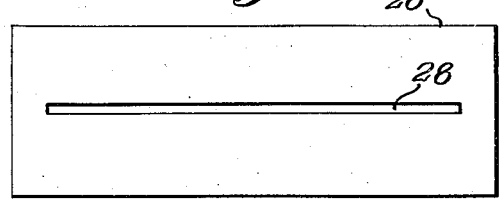

Patented May 13, 1941

2,242,059

UNITED STATES PATENT OFFICE 2,242,059

BOX

William J. De Witt, Auburn, N. Y., assignor to Shoe Form Co., Inc., Auburn, N. Y., a corporation of New York Application March 11, 1939, Serial No. 261,219

6 Claims. (Cl. 220—22)

This invention relates to an improvement in boxes made of Celluloid, pyrashell or similar material, and more particularly in boxes of the type shown in my copending application Serial No. 224,723, filed August 13, 1938, which comprises a cylindrical body having face plates and divided by partitions into a plurality of compartments open at the periphery of the body and normally closed by an annular band surrounding and rotatable relative to the body, said band being provided with a normally closed door through which access to the various compartments may be had.

In contrast to the above copending application where the compartments are sector shaped radiating from the center, it is one object of this invention that in a box made according thereto the partitions be so placed that the compartments extend transversely of the body from one side to the other and preferably vary in size.

A further object resides in the provision of a plate parallel to the faces of the body and preferably midway therebetween which plate coacts with the partitions and the front and rear walls of the body to form a plurality of compartments. The periphery of the plate may be spaced inwardly of the periphery of the body so that, when the box is used for fish hooks or similar articles, the edge of the plate may be engaged by the ends of the articles to hold them in position and facilitate their removal.

These and other objects will appear from a consideration of the following description of the invention and the accompanying drawings which form a part thereof and in which Fig. 1 is a front elevation, with parts broken away, of one embodiment of this invention;

Fig. 2 is a side elevation thereof, the lower portion being shown in cross section taken along the line 2—2 on Fig. 1;

Fig. 3 is an enlarged cross-sectional view taken along the line 3—3 on Fig. 1;

Fig. 4 is a view similar to Fig. 1, of another embodiment of this invention;

Fig. 5 is a side elevation thereof, with a portion of the upper part broken away;

Fig. 6 is an enlarged cross-sectional view taken along the line 6—6 on Fig. 4; and Fig. 7 illustrates one of the partitions employed in the box shown in Fig. 4.

The boxes selected for illustration in the drawings are particularly adapted to receive fishhooks and other fishing paraphernalia. It will be understood, however, that boxes embodying this invention are not so limited and may be used for receiving articles of various kinds.

Both embodiments of the invention comprise a cylindrical body 10 having faces 11 and an annular band 12 surrounding the body. The band 12 is so assembled with the body 10 that the body and band are freely rotatable relative to each other. The construction of the body and band here shown is described in detail in the copending application mentioned above and hence a detailed description will not be here given. The embodiments shown in the drawings differ in the means provided for dividing the interior of the boxes into compartments.

Figs. 1, 2 and 3 show an embodiment of the invention in which the interior of the box is divided into compartments by a plate 15 and a plurality of partitions 16. The outer edges of the partitions 16 are seated in grooves 17 formed in the faces 11 and the inner edges rest upon the plate 15. The partitions are secured in position by any suitable means such as an adhesive cement or solvent, e. g., acetone or the like. The partitions are preferably arranged in the manner shown in the drawings. The partitions 16 at one side of the plate 15 define a central compartment 19 closed at the base. The central compartment 20 at the other side of the plate is open at the bottom. The central compartments are sector-like in form and the compartments at each side of each central compartment are segmental in form. Since the compartment 20 is open at the bottom it will accommodate articles which are longer or wider than will the compartment 19. This fact permits placing in the compartment 20 fish-hooks which by reason of their length and the size of the hook ends could not be placed in any other compartment of the box.

The band 12 surrounding the body of the box carries a door 21 which normally closes an open- 22 through the band. Due to the relative rotation of the body and band mentioned above the door 21 may be brought into register with the open mouth of any compartment. The partitions 16 are so located that when the door is in register with the mouth of any compartment on one side of the plate it is not in register with the mouth of any other compartment even though as shown in Fig. 3, the opening 22 and door 21 span the plate 15. This is particularly true of the central compartments 19 and 20.

In the embodiment shown in Figs. 4, 5, 6 and 7 the central dividing plate 25 is supported by partitions 26. Both side edges of the partitions are seated in grooves 27 in both faces 11 of the box. In each partition 26 is formed a slot 28 midway between and parallel to the side edges of the partition. The slots 28 are of such dimensions that they receive and support the plate 25. The plate and partitions are preferably fixed in position by the use of a suitable adhesive cement or acetone.

The plate 25 is of such dimension that its peripheral edge is spaced from the band 12 to form an annular opening 29. The partitions 26 are here shown arranged to provide a plurality of parallel compartments 30. The opening 32 in the band 12 normally closed by the door 31 may be brought into register with any compartment so that articles may be placed in or removed from the compartment. If the compartments bounded on both sides by partitions 26 are used for fishhooks the hooked ends thereof may be placed over the edge of the plate 25 as shown in Fig. 5, and thus held in place. The outer compartments may be used for bait, lures, or the like.

While two embodiments of this invention have been shown and described it will be understood that the invention is not limited thereto and that other embodiments may be made without departing from the spirit and scope of the invention as set forth in the following claims.

I claim:

1. A box comprising a cylindrical body having end faces and an annular band surrounding said body, said end faces having peripheral grooves in their inner surfaces which receive the edges of the band whereby said body and band are rotatable relative to each other, said band having an opening therein and a door normally closing said opening, said body also including means which coact with the end faces to form compartments therein open at the periphery of the body, said compartments being normally closed by said band, and accessible through the opening therein, said means including a plate parallel to and midway between the end faces and partitions extending transversely of said body, said partitions being secured to the end faces of the body and to the plate parallel to said faces.

2. A box comprising a cylindrical body having end faces and an annular band surrounding said body, said end faces having peripheral grooves in their inner surfaces which receive the edges of the band whereby said body and band are rotatable relative to each other, said band having an opening therein and a door normally closing said opening, said body also including means which coact with the end faces to form compartments therein open at the periphery of the body, said compartments being normally closed by said band and accessible through the opening therein, said means including a plate parallel to and midway between the end faces and partitions extending transversely of said body, said end faces having transverse grooves formed therein in which transverse grooves the side edges of the partitions are seated and held in position, said partitions being also secured to said plate.

3. A box comprising a cylindrical body having end faces and an annular band surrounding said body, said band having an opening therein and a door normally closing said opening, said body and band being rotatable relative to each other, said body also including means which coact with the end faces to form compartments therein open at the periphery of the body and normally closed by said band, said means including a plate parallel to and midway between the end faces and partitions extending transversely of said body, said partitions having slots therein in which slots said plate is received and held in position.

4. A box comprising a cylindrical body having end faces and an annular band surrounding said body, said band having an opening therein and a door normally closing said opening, said body and band being rotatable relative to each other, means within the body and forming compartments therein open at the periphery of the body and normally closed by said band, said means including a plate parallel to and midway between the end faces and partitions extending transversely of said body, said partitions on each side of said plate forming a sector-like central compartment and segmental compartments at the side thereof, the central compartment on one side being closed at the bottom.

5. A box comprising a cylindrical body having end faces and an annular band surrounding said body, said band having an opening therein and a door normally closing said opening, said body and band being rotatable relative to each other, means within the body and forming compartments therein open at the periphery of the body and normally closed by said band, said means including a plate parallel to and midway between the end faces and partitions extending transversely of said body, said partitions on each side of said plate forming a sector-like central compartment and segmental compartments at the side thereof, the central compartment on one side being closed at the bottom, and the central compartment on the other side being open at the bottom.

6. A box comprising a cylindrical body having end faces and an annular band surrounding said body, said band having an opening therein and a door normally closing said opening, said body and band being rotatable relative to each other, means within the body and forming compartments therein open at the periphery of the body and normally closed by said band, said means including a plate parallel to and midway between the end faces and partitions extending transversely of said body, said partitions on each side of said plate forming a sector-like central compartment and segmental compartments at the side thereof, the central compartments being so arranged that the bottom of each one is adjacent the mouth of the other one.

WILLIAM J. DE WITT.